Feb. 3, 1959     L. A. HOSFORD     2,872,213
TRAILER HITCH
Filed Oct. 18, 1956
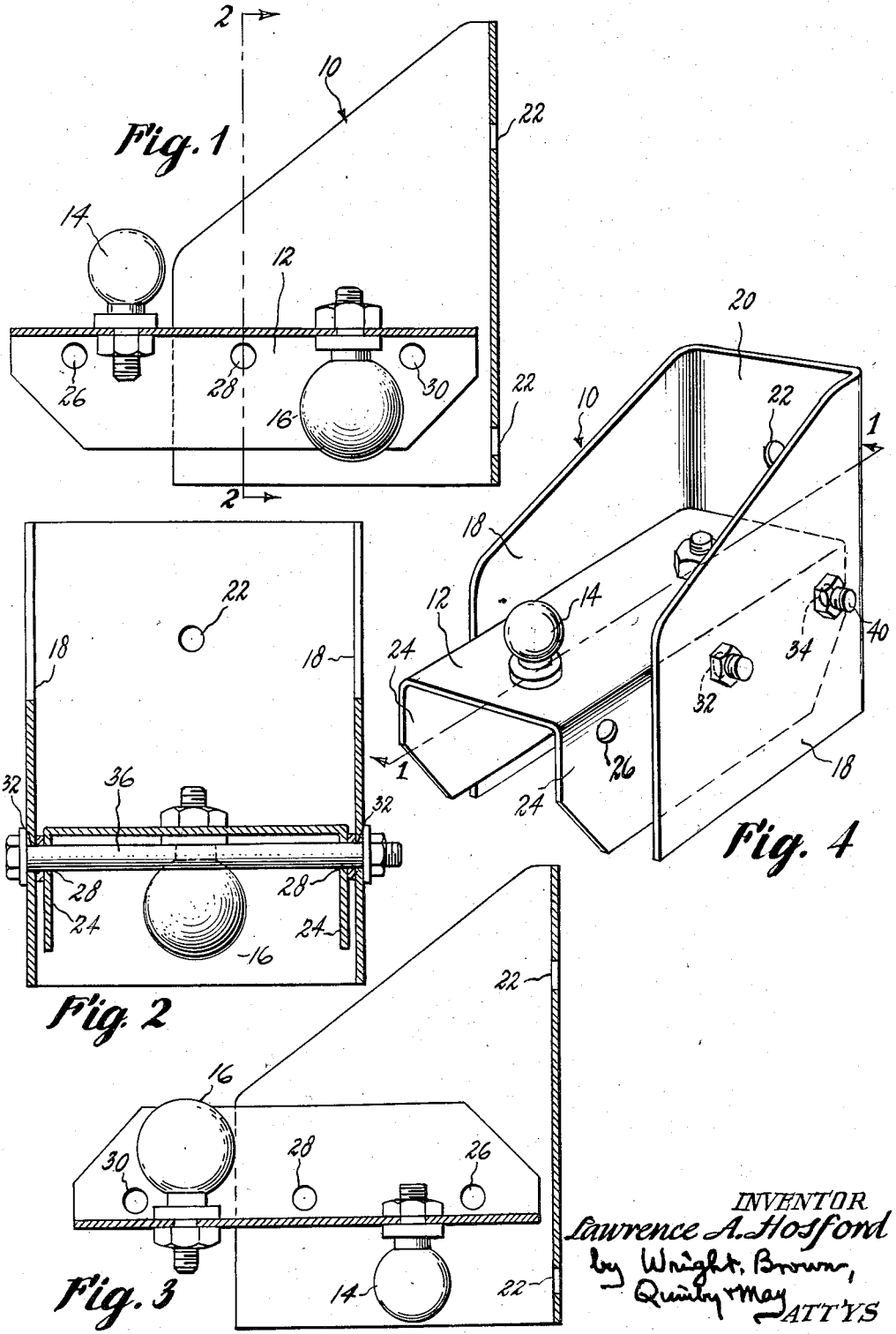
INVENTOR
Lawrence A. Hosford
by Wright, Brown,
Quinby + May
ATT'YS

2,872,213
TRAILER HITCH

Lawrence A. Hosford, Windsor, Vt.

Application October 18, 1956, Serial No. 616,875

2 Claims. (Cl. 280—415)

This invention relates to a trailer hitch which can quickly and easily be adapted to join with either of the two sizes of sockets which are substantially standard on trailers to be towed by automobiles.

The invention is embodied in a structure comprising a short vertical channel piece to be secured to the rear bumper or other rigid member of the towing automobile. Between the walls of this member is a horizontal channel member secured by two bolts which pass through the side walls of both members, one of the bolts being in or near the transverse median plane of the horizontal channel member. Secured to the floor of this member are two spherical knobs or balls of different diameters to fit either of the two sizes of sockets usually employed on coupling members carried by trailers. As hereinafter described, these balls are arranged for alternative use according to the size of the socket which is to receive a ball. For a more complete understanding of the invention, reference may be had to the following description thereof and to the drawing, of which—

Figure 1 is a sectional view on the line 1—1 of Figure 4, the bolts being omitted;

Figure 2 is a section on the line 2—2 of Figure 1;

Figure 3 is a sectional view similar to Figure 1, but showing the movable member in a different position; and Figure 4 is a perspective view of the device.

The embodiment of the invention illustrated on the drawing consists essentially of a supporting frame 10 adapted to be welded, bolted, or otherwise secured to the rear of a towing car, a member 12 carrying two balls 14 and 16 of different sizes, and means for securing the member 12 to the frame 10 in either of two relative positions in which one or the other ball will be supported in a suitable position to join with a complementary socket on a trailer (not shown), the securing means being such that the member 12 is held rigidly in either of its positions but can quickly and easily be released to be moved to its other position. The members 10 and 12 may be cast, forged, bent to shape or otherwise formed as desired to perform their required functions and to carry the loads for which they are intended. While there are many ways in which the member 12 could be moved from one of its operative positions to the other, the particular movement illustrated is a rocking movement about a horizontal axis at or near its mid point. The balls 14 and 16 are mounted on the member 12 at approximately equal distances from the rocking axis, one projecting upward while the other projects downward so that when the member is rocked to reverse itself end for end, the ball in the operative position will move to the inoperative position and vice versa.

The member 10 may conveniently be in the form of a vertical channel consisting of parallel side walls 18 connected by a web 20. The latter may be welded to the rear of a towing car or secured thereto by bolts or the like, suitable holes 22 being provided if desired therefor.

The movable member 12 is preferably elongated and may be in the form of a channel with side walls 24 which stiffen the member and also facilitate the securing of the member to the support frame 10. For this purpose each side wall 24 is provided with a series of three spaced holes 26, 28 and 30, the holes 28 being substantially at the longitudinal mid point of the member, the holes 26 and 30 being near the ends of the member and equally spaced from the hole 28. Thus the three holes in each side wall 24 are directly opposite the corresponding holes in the other wall 24.

Each wall 18 of the supporting frame has two holes 32 and 34 therethrough, these holes being arranged and spaced to be aligned respectively with the mid holes 28 and either pair of end holes 26 or 30. A bolt or rivet 36 passes through the holes 28 and 32 and serves as a rocking axis for the member 12 so that when otherwise free, the member 12 can be reversed end for end. To secure the member 12 in one position or the other, a second bolt 40 is thrust through the holes 34 and either pair of holes in the member 12. If the latter is in the position shown in Figure 1, the bolt 40 goes through the holes 30 as well as the holes 34. If the member 12 is in the reversed position shown in Figure 3, the bolt 40 goes through the holes 34 and 26.

When the member 12 is in the position shown in Figure 1, the end portion on which the smaller ball 14 is mounted projects outward beyond the parallel walls 18 and supports the ball 14 in its operative position, the larger ball being then in its inoperative position. To exchange the positions of the balls, the bolt 40 is removed, releasing the member 12 for rocking movement about the axis of the bolt 36. The member 12 is swung about an angle of 180° which brings the larger ball 16 into operative position and the holes 26 in line with the holes 34. The bolt 40 is replaced and secured in position, and the ball 16 is ready to join with a complementary socket.

It is evident that many details of the structure herein described may be varied without departing from the scope of the invention as defined in the following claims.

I claim:

1. A trailer hitch comprising a frame adapted to be secured to an automotive vehicle, said frame consisting of two parallel vertical plates and a web rigidly connecting said plates and projecting beyond them, a rockable member disposed between said plates, a transverse pivot element adjacent to the mid point of said rockable member rockably securing said member to said parallel plates, a removable transverse element extending through said parallel plates and engaging said rockable member to hold the latter against rocking movement with either of its end projecting beyond the parallel plates, and two balls secured to said rockable member near the respective ends thereof and extending in opposite directions from the plane of said member.

2. A trailer hitch as in claim 1, said rockable member being in the form of a channel with side walls each having three holes therethrough, said elements being two bolts each extending through said vertical plates and through certain of said holes in the side walls of said channel.

References Cited in the file of this patent

UNITED STATES PATENTS

| 2,635,891 | Cook | Apr. 21, 1953 |
| 2,726,880 | Klein | Dec. 13, 1955 |

FOREIGN PATENTS

| 463,395 | Germany | July 27, 1928 |